Jan. 6, 1970  G. R. KERN, JR  3,487,853
FLUID SELECTOR VALVES AND MANIFOLD
Filed Jan. 8, 1968  3 Sheets-Sheet 1
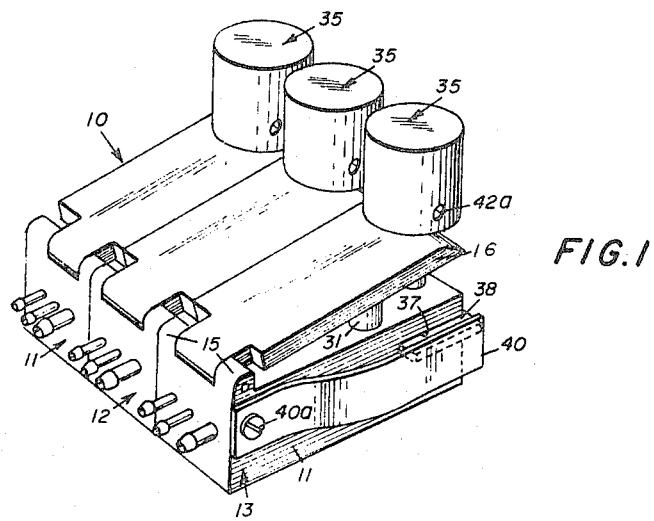
FIG.1
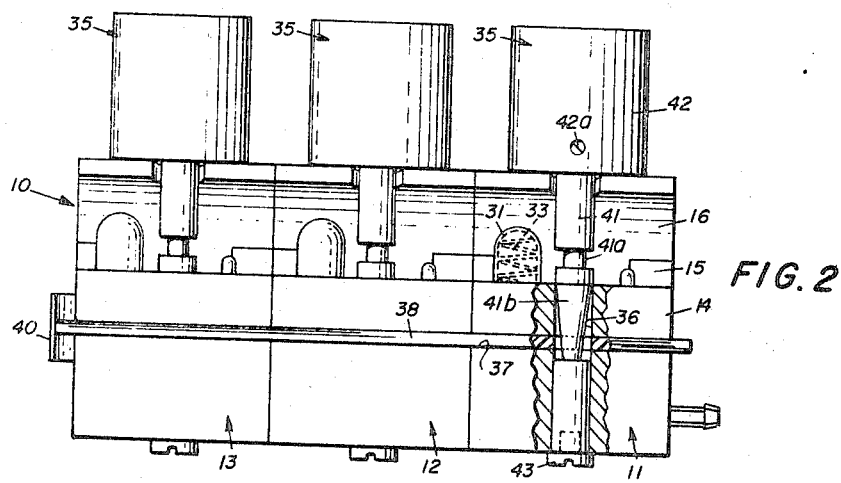
FIG.2
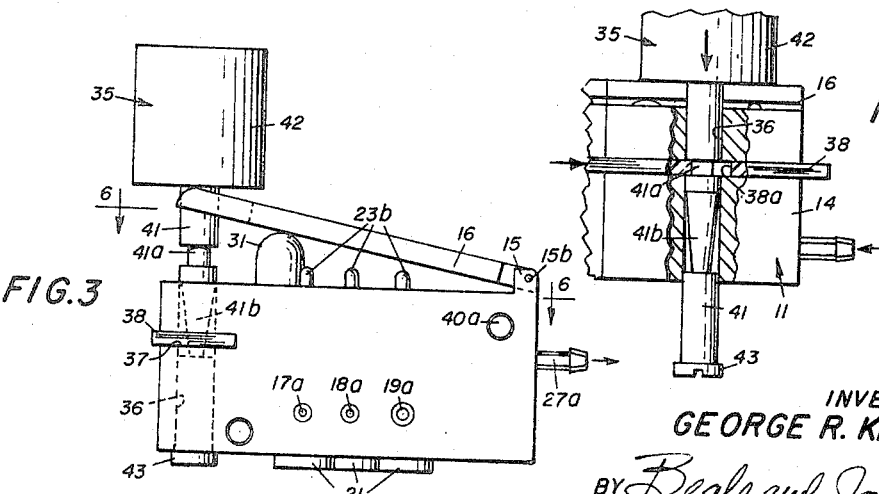
FIG.2A
FIG.3
INVENTOR
GEORGE R. KERN, JR.
BY Beale and Jones
ATTORNEYS INVENTOR
GEORGE R. KERN, JR.
BY Beall and Jones
ATTORNEYS Jan. 6, 1970 G. R. KERN, JR 3,487,853
FLUID SELECTOR VALVES AND MANIFOLD
Filed Jan. 8, 1968 3 Sheets-Sheet 3

INVENTOR
GEORGE R. KERN, JR.
BY *Beale and Jones*
ATTORNEYS

United States Patent Office 3,487,853
Patented Jan. 6, 1970

3,487,853
FLUID SELECTOR VALVES AND MANIFOLD
George R. Kern, Jr., 5525 N. 23rd St.,
Arlington, Va. 22205
Filed Jan. 8, 1968, Ser. No. 696,401
Int. Cl. F17d *3/00;* F16k *35/14;* A62c *19/00*
U.S. Cl. 137—637.1
6 Claims

ABSTRACT OF THE DISCLOSURE

A fluid sectionalized distribution manifold having a common supply passage through the sections, each section having a valve and a protruding valve stem, the valve controlling flow to a connecting branch discharge line in each section. An operator member on each section for the protruding valve stems and a reciprocable plunger member for each operator on each section, the plunger member having a tapering cam surface and a locking slot that cooperate with a common spring pressed slide member extending through all sections and having spaced apertures therein receiving the valve stems to slide into a locking slot of a depressed valve stem so as to hold the valve open and to be moved from locking position in the slot by the cam surface of another valve stem as the other stem is moved by an operator.

BACKGROUND OF THE INVENTION

Field of the invention

This invention relate to fluid distribution manifolds and the operation of the valves therein to control flow to branch lines leading from a common supply line in the manifold.

The prior art shows fluid distribution manifolds with branch cut off valves such as in U.S. Patent 2,901,002 where a common operator provides for segmented operation of the manifold valves. Also there is shown in U.S. Patent 2,399,460 a rotary multiselector valve.

SUMMARY

This invention provides for selective control of fluid distribution in a distribution manifold that is sectionalized. Each section has its own valve to its own discharge branch leading from a common supply passage. Selective operation of only one valve at a time is provided through an interlock which holds one valve open while the others are closed and permits closing of the opened valve on opening another of the valves of the manifold. The apparatus lends itself, for example, to the control of a number of fluid lines in a dental office to a number of fluid driven handpieces that are supplied with driving compressed air, air under pressure for impingement of selected areas and also for control of water spray.

BRIEF DESCRIPTION OF THE DRAWINGS

FIG. 1 is a perspective of the sectionalized distribution manifold;

FIG. 2 is a front elevational view of the mechanism of FIG. 1 on an enlarged scale with one of the sectionalized distribution portions of the manifold broken away;

FIG. 2A is a view of the one sectionalized portion of FIG. 2 with the plunger operator in a down and operating position;

FIG. 3 is a righthand end view of FIG. 2;

DESCRIPTION OF THE PREFERRED EMBODIMENT

Throughout the description, like reference numbers refer to similar parts.

A fluid sectionalized distribution manifold is shown generally at 10 in FIG. 1. The illustration here made is of three sections 11, 12 and 13 that are for the most part identical. Only one section will be described.

Figure 5:
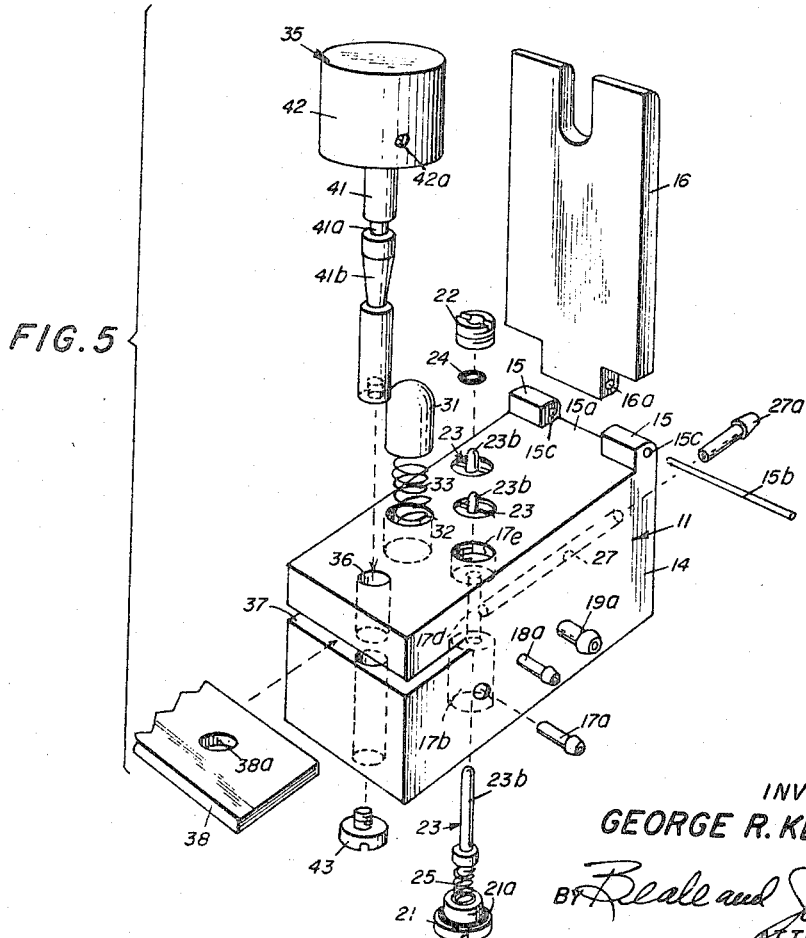
FIG. 5 is a perspective exploded view of one of the sections of the mechanism of FIG. 1 on an enlarged scale.
Figure 6:
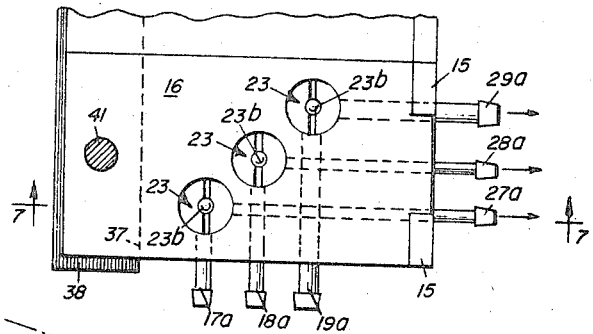
FIG. 6 is a top plan view along line 6—6 of FIG. 3 with the hinged operator in nonoperating position.

Section or unit 11 has a body member 14 of generally rectangular parallelopiped shape having an unstanding boss 15 that is slotted at 15a, see FIG. 5, to receive a hinged operator member 16 attached thereto by a pintle 15a received in an aperture 15c formed in the boss and an aligned aperture 16a formed in the hinge member 16.

Figure 4:
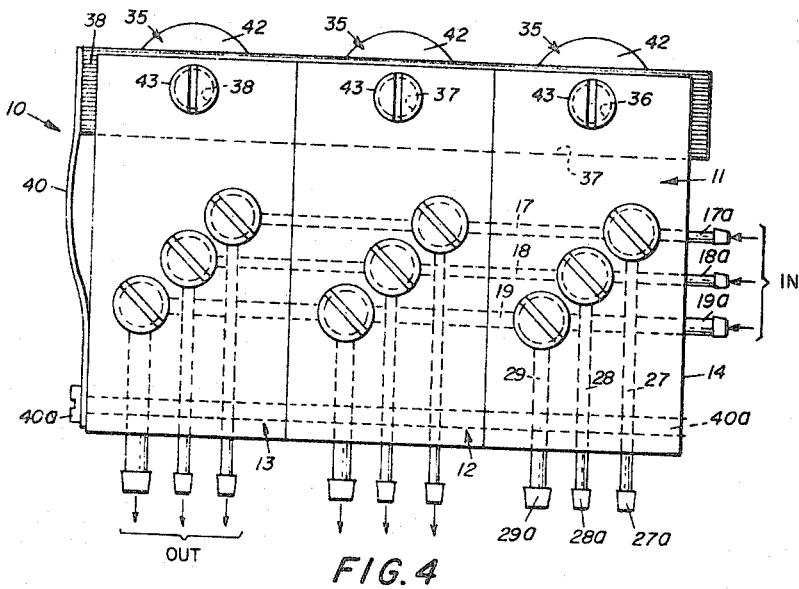
FIG. 4 is a bottom plan view of FIG. 2.
Figure 7:
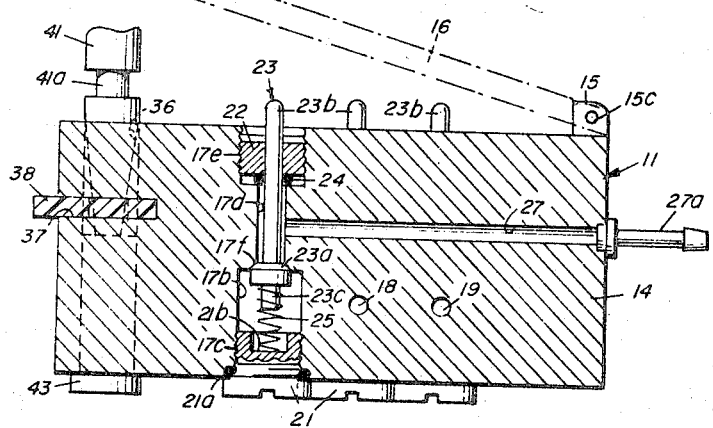
FIG. 7 is a sectional view on an enlarged scale along line 7—7 of FIG. 6.

In FIG. 4 each of the body members 14 are shown as having three inlet passages 17, 18 and 19 extending in spaced relation transversely therethrough so as to connect with like passages in the abutting sections. There are inlet conduit connections 17a, 18a and 19a at the outside of the righthand section shown in FIG. 4 while the lefthand section only has the passages extending part way through. Each of the passages 17, 18 and 19 connects respectively with a vertically extending passageway 17b, 18b and 19b in the body 14. Each of the vertical passageways has a lower enlarged portion that is threaded at its lower end 17c, see FIG. 7, to receive a cap screw 21 that has an O-ring seal 21a and a compression spring receiving cavity 21b in its inside face. A smaller central portion 17d connects the enlarged lower portion with an enlarged upper portion 17e that is threaded to receive a securing apertured valve stem guide plug 22. A valve seat 17f is formed between the lower enlarged portion of 17b and the central portion 17d. A reciprocating valve member 23 having a valve face 23a is received in the vertical passage 17b so that the face seats on valve seat 17f. The valve stem 23b of valve member 23 extends upward through central portion 17d and through an O-ring seal 24 in cavity 17e and on up through the apertured plug 22 so as to extend up above the upper face of body 14. A compression spring 25 is received in the lower larger cavity of the vertical passage 17b and seats in the recess 21b in plug 21 and on a depending pin portion 23c on the valve stem to urge the valve stem 23 upward and closed as shown in FIG. 7. Extending lengthwise in each body 14 is a passageway 27, 28 and 29 connecting with each of the vertical passageways 17b, 18b and 19b. Outside connectors 27a, 28a and 29a connect with these passages 27, 28 and 29 and are formed with enlarged ends to receive discharge hoses (not shown) for the fluid transferred by this sectionalized distribution manifold.

Figure 8:
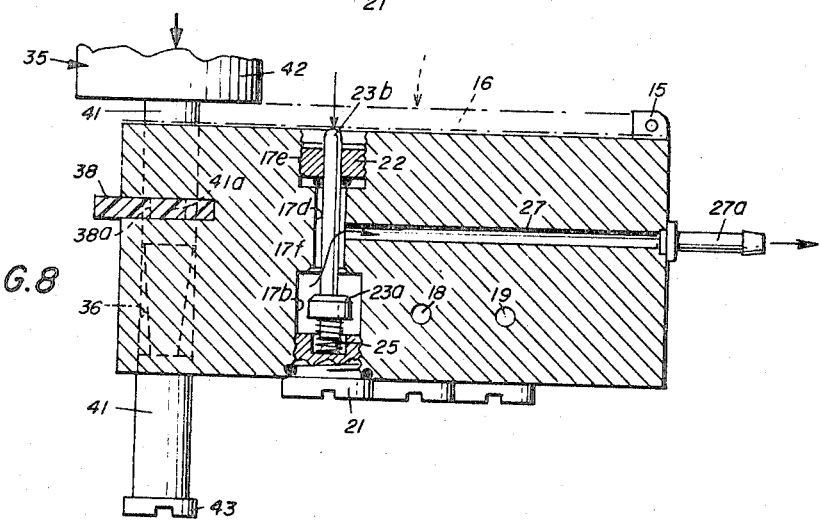
FIG. 8 is a view similar to FIG. 7 showing the hinged operator in operating position.

In FIG. 7 the valve is shown closed while in FIG. 8 the valve is shown in an open position to permit flow from passage 17 to passage 27 within the body 14.

The hinged operator 16 for the valve stems 23b is best shown in FIG. 5. These valves in each section are operated simultaneously as the hinged operator 16 is pressed down thereagainst.

The hinged operator 16 is spring biased towards open or hinged out position not only by the valve springs 25 but also by a spring pressed pin 31, see FIG. 5, received in a recess 32 in the upper face of body member 14. A spring 33 received in recess 32 presses the pin 31 upward to urge the pin 31 against the lower face of hinged operator member 16. This hinged operator member 16 has a pin or push button operator generally indicated at 35.

Each of the unit sections 11, 12 and 13 has a second vertically extending aperture therein at 36, 37 and 38 at the opposite end from that of the hinged operator 16 pivotal connection to the body member. Received in the aperture 36 is the operator 35 as will be described.

Extending transversely across the body members is a slot that intersects the vertical aperture 36. Within this slot is received a slide member 38 having vertically extending apertures 38a therein for alignment with the respective vertical apertures 36 for cooperation with the operator member 35 as will be described. The slide member 38 is spring biased at one end as by the leaf spring 40 that is secured by a through bolt 40a passing through aligned apertures in each of the sections 11, 12 and 13 and threadedly received in a threaded portion formed in section 11.

Each operator 35 has a cam rod 41 that is received in the apertures 36. An operating button 42 is received on the upper end of rod 41 and secured thereto by a set screw 42a. The lower end of rod 41 has a threaded recess that receives a screw 43 having an enlarged head so as to limit the upward travel of rod 41.

The rod 41, see FIG. 5, is formed with a reduced portion 41a that receives the edge of aperture 38a in slide 38 to hold the rod 41 in a locked down position. Spaced below the reduced portion 41a on rod 41 is a cam portion 41b formed as a tapered portion with the taper formed by a decreasing diameter of the rod. This cam portion 41b cooperates with the aperture 38a in the slide 38.

Referring to FIG. 2A, the rod 41 is shown in locked down position wherein the edge of slide aperture 38a is received in recess 41a. In FIG. 2 on pushing down the operator 35 of another section from that shown in FIG. 2A, the edge of aperture 38a in slide 38 is contacted by the cam portion 41b of its rod 41 and is forced to move to the left so as to permit aperture 38a in the slide in FIG. 2A to move to the left out of slot 41a thus permitting operator 35 to move back up under the influence of spring pressed up hinged member 16.

The slide 38 may also be pushed to the left, see FIGS. 2 and 2A, at its protruding end opposite its spring pressed end.

There has been provided by this mechanism a sectionalized distribution manifold that is compact yet will handle a number of manifold fluid distribution lines or passages. It is positive in action and permits the control of fluid distributed from a common source to a number of different conduits such as different fluid operated handpieces in a dentist's office. The additional passages permit, besides the motive fluid for the handpiece turbine, cleansing water and an air jet. Many uses may be made of this compact and positive acting sectionalized fluid distribution manifold.

I claim as my invention:

1. A fluid sectionalized distribution manifold comprising, in combination, a body member having a common fluid passage therethrough, a plurality of spaced apart valves in said common supply passage, branch fluid passages communicating with said common supply passage through said respective valves, said valves having an operating stem in said body member projecting from one face of same and biasing means urging them closed, push members on said face of the body member for operating each of said respective projecting valve stems to open its valve against said biasing means, biasing means for urging each push member away from said face of the body member, a plunger for each of said push members reciprocably mounted in said body member engaging and holding said push member against the action of the biasing means and valve stem, said plunger being moved by pressure thereon applied by the finger of an operator, said plunger having a caming means thereon and a locking portion thereon adjacent the caming portion and towards said push member, said body member having an elongated slide receiving slot extending therethrough transverse to the plunger, an elongated slide received in said slot of the body member and having an aperture therein for each plunger of the size of said cross section of the plunger and receiving the plunger, biasing means urging said elongated slide member in one direction, said cam portion of the plunger acting against the edge of said aperture in the slide member to move said slide against said biasing means and said aperture of the slide riding in said locking portion to hold said plunger against said biasing means.

2. A fluid sectionalized distribution manifold according to claim 1 wherein said push members are hinge members hingedly connected to said body members.

3. A fluid sectionalized distribution manifold according to claim 1 wherein there are individual sections housing each valve and the connecting passages in abutting side by side relation making up said body member.

4. A fluid sectionalized distribution manifold according to claim 3 wherein the end section opposite to the section having the incoming supply passage has the common supply passage terminating at its valve.

5. A fluid sectionalized distribution manifold according to claim 1 wherein said valve operating stem projects through a seal and removable securing bushing in the body and wherein said biasing means for said valve is a coil spring held in the body against the valve by a removable plug member in said body.

6. A fluid sectionalized distribution manifold according to claim 1 wherein said biasing means for urging each push member away from said face of the body member is a spring pressed plunger housed in the body member and projecting out from said body member against the push member.

References Cited

UNITED STATES PATENTS

| | | | |
|---|---|---|---|
| 2,591,602 | 4/1952 | Pilcher | 137—637.1 |
| 2,901,002 | 8/1959 | Small | 137—635 |
| 2,986,168 | 5/1961 | Sikula | 137—636.1 X |
| 3,112,761 | 12/1963 | Swartz | 137—635 X |

CLARENCE R. GORDON, Primary Examiner

U.S. Cl. X.R.

137—608